United States Patent [19]
Noel

[11] 3,807,057
[45] Apr. 30, 1974

[54] TRAY WITH DISPOSABLE CUP MEANS FOR IMPROVED PROOFING AND HANDLING OF DOUGHBALLS FOR ENGLISH MUFFINS

[76] Inventor: Eugene M. Noel, 42 Kingston Rd., Newton Highlands, Mass. 02161

[22] Filed: Apr. 23, 1973

[21] Appl. No.: 353,604

[52] U.S. Cl.............. 34/237, 220/23.2, 425/89, 117/5.1, 249/113, 211/126, 34/196
[51] Int. Cl............................................. F26b 25/18
[58] Field of Search ....... 220/23.2, 23.4, 23.6, 23.8; 34/237, 238, DIG. 3, 196; 161/159; 425/89; 249/113; 117/5.1; 229/27, 29 F; 248/176, 310, 94; 211/126

[56] References Cited
UNITED STATES PATENTS

| | | | |
|---|---|---|---|
| 2,345,939 | 4/1944 | Leary | 117/5.1 |
| 3,630,350 | 12/1971 | Bolton | 220/23.2 |
| 1,780,422 | 11/1930 | Geiler | 220/23.8 |

Primary Examiner—Carroll B. Dority, Jr.
Assistant Examiner—Larry I. Schwartz
Attorney, Agent, or Firm—Rummler & Snow

[57] ABSTRACT

A plastic tray for use in English muffin doughball proof-boxes and automated feeders for industrial muffin cooking griddles having a plurality of cavities in its top comprising cups with a nylon flocked upper surface for containing doughballs. The trays, when stacked in over-and-under spaced relation in the proof-box, have porous cups and open ends which allow the conditioned proofing air circulating through the box to freely pass over, around and about the doughballs placed in the cups, thereby obtaining a more uniform standard of proofing all over each doughball and for all the doughballs being proofed. The nylon flocked cover on the cups releases the doughballs from their respective cups instantaneously without sticking when the tray is inverted in automated feeders in the process of transfer to the cooking griddles.

4 Claims, 4 Drawing Figures

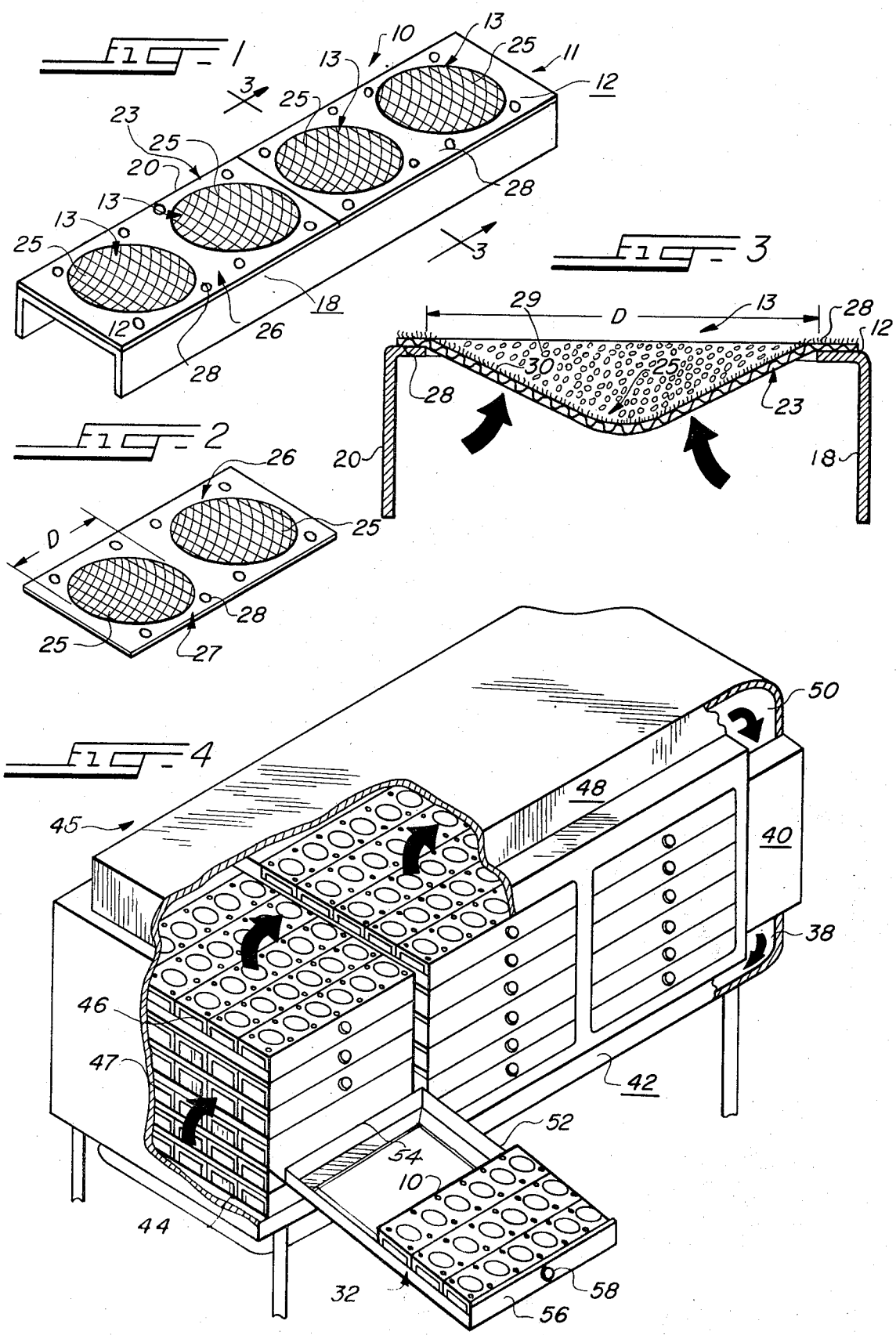

TRAY WITH DISPOSABLE CUP MEANS FOR IMPROVED PROOFING AND HANDLING OF DOUGHBALLS FOR ENGLISH MUFFINS

BACKGROUND OF THE INVENTION

In the process of bringing dough to a standard lightness in its preparation for the grilling and toasting of English muffins, it is important to expose the dough to the air having a given moisture content and a given dry bulb temperature for a certain period of time in order to bring a uniform standard of lightness for all the dough of all muffins being proofed. The emphasis here is on the word uniform because with past proofing trays, it has not been possible for all the conditioned air within the proof-box to fully circulate from the bottom to the top through all of the box and surrounding all of the doughballs therein because the tray material and the cavity material wherein the doughballs are proofed are sheet pans or any other solid pan, all of which are impervious to the passage of air through the trays stacked therein. Different doughballs in different trays and different parts of the same doughball have thus received different exposures to the conditioned air circulating in the box leading to a non-uniformity of lightness of the dough in all the muffins.

In the operation of high-speed industrial muffin griddles and the automated feeding of proofed doughballs thereto, it is important that the mechanism for operating the tray and receiver upendings and uprightings properly coordinate the dump of the doughballs therefrom and be at predictable and certain times during the automated feeding duty cycle. In practice, it is thus essential then that the freshly proofed doughballs not adhere to the upper surface of the cups in the tray when it is upended. These doughballs should immediately drop from the inverted tray to the waiting receiver cup below in a consistent and predictable manner. The emphasis is on timing of the dump of the doughballs because with freshly proofed doughpieces, the tendency has been for the doughpieces to stick to the upper surface of the cavity material of the tray cups and delay the dump therefrom an uncertain time.

There is thus an established need for a tray for use in the proofing and automated feeding of muffin doughballs for industrial grilling which allows the free circulation of proofing air uniformly around and over the whole surface of each and every doughball in every tray stacked in the proofer box and which tray has a material covering the cavity surface of the cups therein to which the freshly proofed doughpieces will not adhere upon upending of the tray in the automated feeders.

SUMMARY OF THE INVENTION

The gist of this invention lies in the use of the cups and open-ended frame channels in proofing trays as air passageways through and over the top of a tray for a more uniform proofing of doughballs in proofing boxes. White ABS (acrylonitrile, butadiene, styrene) 0.090 inches thick thermoplastic sheet material which has apertures punched in the flat is thermo-formed into a channel shape to form the tray frame. Strips made of white high-impact thermoplastic styrene 0.020 inches thick having vacuum formed cavities which match the size and spacing of the holes punched in the top of the tray frame and which function as cups in the surface of the strip for containing the doughballs are adhesive-sealed to the top of the tray frame. The strips can be porous to give cups which allow proofing air to circulate up through the top of the tray. Nylon flocking 0.050 inches long is applied with a solvent and pressure to the upper surfaces of the cup cavities to prevent the sticking of the freshly proofed doughballs in the cups of trays used in automated feeders for industrial muffin griddles.

DESCRIPTION OF THE DRAWINGS

In order to demonstrate the invention, reference is made to the non-limiting embodiment illustrated by the drawings in which:

FIG. 1 is a perspective view of a four-cup tray using one standard two-cup porous cavity replacement strip with the 0.050 inches long nylon flocking thereon secured alongside the remaining part of a standard four-cup porous cavity strip which has half of its cups removed;

FIG. 2 is a perspective view of a standard two-cup replacement strip without porous cavities;

FIG. 3 is a cross-sectional view through a cup along line 3—3 of the tray of FIG. 1 showing the porous cavity in the cup with a nylon flocked upper surface for preventing doughball sticking; and FIG. 4 is a fragmented cutaway perspective view of a typical proof-box loaded with six-cup channel trays with open ends using standard six-cup porous cavity strips which provide for the uniform circulation of the proofing air around and over the doughballs.

THE PREFERRED EMBODIMENT

Referring to FIG. 1, a standard four-cup proofer tray assembly 10 comprises a one-piece rectangular frame 11 having a top panel 12 which is made of solid white ABS (acrylonitrile, butadiene, styrene) 0.090 inches thick thermoplastic sheet material. Four circular holes 13 are equally spaced along the length of the panel 12, each having a diameter D, as shown in FIG. 3. A first flange 18 on one side of the top 12 and a second flange 20 on the opposite side thereof, together with the top 12, form a folded channel-shaped structure running the length of the frame 11 in connection with and vertically depending from the sides of the top 12.

Referring again to FIG. 1, the tray assembly 10 comprises a standard rectangular cavity strip 23 made of white high-impact styrene 0.020 inches thick thermoplastic sheet material which has four cylindrical cavities for four (or six) cups 25, each cup having the same diameter D as the holes 13 in the frame 11. The cups 25 are vacuum-formed in the strip 23 to give an upright dish-shape with its cavity side facing up and are located at the same equal spacing along the length of strip 23 as the holes 13 in the frame 11. The strip 23 is accurately cut to size in a fixture which locates the cavities 25 with reference to the longitudinal sides and ends thereof. The cavities in the strip 23 have a cross-section shape with flat marginal areas 28 to each side thereof, as shown in FIG. 3. The cavities 25 can be made porous by having apertures 29 punched therein after molding, as shown in FIG. 3. A cover of 0.050 inches long natural nylon flocking 30 covers the entire top side of cavity 25 and the surrounding marginal areas 28.

Referring to FIG. 2, a replacement cup assembly 26 comprises a one-piece rectangular cavity strip 27 made of white high-impact styrene 0.020 inches thick thermoplastic sheet which has two cavities 25 each having the same diameter D as the holes 13 in the frame 11 for forming two cups therein. The cups 25 are likewise vacuum-formed in the strip 27 to give an upright dish-shape with its cavity side facing up and are located at the same equal spacing along the length of replacement assembly 26 as the holes 13 in the frame 11. The replacement assembly 26 is also accurately cut to size in a fixture which locates the cavities 25 with reference to the longitudinal sides and ends thereof. The cavities 25 in the strip 26 have the same cross-sectional shape with flat margins 28, as shown in FIG. 3. A cover of 0.050 inches long nylon flocking 30 covers the entire top side of cavity 25 and marginal areas 28. Replacement of damaged cups 25 in the tray 10 is made by removal of the replacement assembly 26 containing the damaged cup 25 from the frame 11 leaving the undamaged remaining part of the standard four-cup cavity strip 23, as shown by the solid line across the tray frame midway along its length in FIG. 1. A typical replacement assembly cup 25 has a flat marginal area 28 therearound, as shown in FIG. 3, and a cover of 0.050 inches long natural nylon flocking 30 covering the entire top side of the cavities 25 and the surrounding marginal areas 28 thereof.

In the assembly of the standard cavity strips 23 to the tray frames 11, the top 12 of tray frame 11 is dipped into a solvent. The strips 23 are placed into a holding fixture with cavities 25 face down and the solvent-dipped tray frame 11 is inverted and placed face down with top 12 in contact with the under side of the flat marginal areas 28 around the cavities 25 of the strips 23. Pressure is applied on the back side of the inverted tray 10 to secure a complete bond between the strip 23 and the top 12 of the tray frame 11.

In the flocking of the cup cavities 25 of the tray assembly 10, adhesive and nylon are applied simultaneously to the top side of the cavities 25 and surrounding marginal areas 28 of the strips 23. The remaining area of the top 12 of the frame 11 is masked during the application to omit subsequent flocking therefrom. The cavities 25 and margins 28 with the flocking secured thereon are then oven cured.

A drawer 32 for use in the storage and proofing of doughballs in the trays 10 comprises a rectangular frame which has an open bottom and two parallel longitudinal angle iron members 52 having top edges which are in the same horizontal plane and extend only partially up the flanges 18 and 20 over the open ends of the tray frame 11 when the tray is inserted in the drawer 32 and which are connected at the back end by a cross angle member 54 and at the front end by a cross angle member 56, as shown in FIG. 4. A handle 58 is secured midpoint to the outside of front cross angle member 56 offering purchase for the opening of the drawers 32. The distance between the inside faces of longitudinal strip members 52 is slightly greater than the distance between the ends of vertical legs 18 and 20 of tray 10 so that the tray 10 and its frame 11 slidably fit in and rest on the inside dimension between the vertical flanges of the longitudinal rail members 52 and on the horizontal flanges thereof.

The operation of a proof-box 45 for use with the improved proofing tray 10 is demonstrated in FIG. 4. In this case, standard six-cup trays 10 are loaded with unproofed doughballs and laid in proofer-tray drawers 32 in side-by-side relation therein. The proofer tray drawers 32 with their loads of trays 10 are slid into place in a tray stack 47 and stacked on guide rails in an over-and-under relation therein. A lower supply duct 38 for conditioned air having a bottom inlet duct 42 receives air at a controlled humidity and temperature from air conditioner 40. Drawers 32 having open bottoms are stacked one above the other over bottom inlet duct 42 to allow the circulation of the conditioned air from the bottom 44 through the top 46 of a tray stack 47. Upper air return duct 48 having an outlet 50 receives the discharge air from the tray stack 47 which is flowing upward through the individual cups 25 of the trays 10 in the direction as indicated by the arrows shown in FIG. 3 and recirculates therefrom through air conditioner 40.

Although but one specific embodiment of this invention has been herein shown and described, it will be understood that the details of construction shown may be altered or omitted without departing from the spirit of the invention as defined by the appended claims.

I claim:
1. A tray for improved proofing and handling of doughballs comprising:
   a. a channel-like frame having a top panel with a plurality of spaced apertures located therein;
   b. a rectangular strip of porous thermoplastic material having a top side surface and a recessed portion therein matching the location of an aperture in the frame and secured to the top panel thereof; and
   c. floccule secured to the top side surface of said recessed portion.

2. A tray as set forth in claim 1 wherein the porous thermoplastic material comprises porous, white, high-impact styrene.

3. A tray as set forth in claim 1 wherein the floccule comprises natural white nylon.

4. A tray as set forth in claim 1 wherein said rectangular strip of porous thermoplastic material having a top side surface comprises a plurality of spaced recesses therein matching the location of said apertures in the frame and secured to the top panel thereof.

* * * * *